United States Patent
Bukhamseen et al.

(10) Patent No.: US 12,057,024 B1
(45) Date of Patent: Aug. 6, 2024

(54) PHONICS PRISM SYSTEM FOR THE DYSLEXIC

(71) Applicant: KING FAISAL UNIVERSITY, Al-Ahsa (SA)

(72) Inventors: Amani Mohammed Bukhamseen, Al-Ahsa (SA); Mamdouh Mosaad Ahmed Helali, Al-Ahsa (SA); Rommel Mahmoud Ali Alali, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/531,257

(22) Filed: Dec. 6, 2023

(51) Int. Cl.
   *G09B 17/00*   (2006.01)

(52) U.S. Cl.
   CPC .................. *G09B 17/003* (2013.01)

(58) Field of Classification Search
   CPC ..................................................... G09B 17/003
   See application file for complete search history.

(56) References Cited

U.S. PATENT DOCUMENTS

| | | | | |
|---|---|---|---|---|
| 3,426,451 A * | 2/1969 | Hoffmann | ............... | G09B 17/00 101/399 |
| 3,842,822 A * | 10/1974 | Levinson | ............... | A61B 5/398 351/222 |
| 6,443,572 B1 * | 9/2002 | Lawson | ................... | A61B 3/00 351/203 |
| 8,517,739 B2 * | 8/2013 | Dekkers | ............... | G09B 17/006 434/178 |
| 10,692,393 B2 * | 6/2020 | Kochura | ................. | G09B 5/02 |
| 10,699,592 B2 * | 6/2020 | Kochura | ............. | G09B 17/003 |
| 10,866,484 B2 * | 12/2020 | Lin | ........ | G02F 1/3553 |
| 10,873,175 B2 * | 12/2020 | Ramer | .................. | H01S 5/4087 |
| 11,361,143 B2 * | 6/2022 | Govindjee | ............ | G06F 16/337 |
| 11,504,000 B2 * | 11/2022 | Khan | ................ | A61B 3/12 |
| 11,526,654 B2 * | 12/2022 | Seward | ................ | G06F 40/109 |
| 11,551,568 B2 * | 1/2023 | Raynaud | ................ | G09B 5/06 |
| 11,835,725 B2 * | 12/2023 | Chang | ................ | G02B 27/0176 |
| 2008/0247620 A1 * | 10/2008 | Lewis | .................... | G16H 30/40 382/128 |
| 2009/0079937 A1 | 3/2009 | Chen et al. | | |
| 2013/0224697 A1 * | 8/2013 | McCallum | ............. | G09B 23/02 434/188 |
| 2022/0036759 A1 * | 2/2022 | Proudfoot | ................ | G09B 5/06 |
| 2022/0151489 A1 | 5/2022 | Khan | | |
| 2023/0154352 A1 * | 5/2023 | Shemyakina | .......... | G09B 17/02 |

\* cited by examiner

*Primary Examiner* — Xuan M Thai
*Assistant Examiner* — Sadaruz Zaman
(74) *Attorney, Agent, or Firm* — Nath, Goldberg & Meyer; Joshua B. Goldberg

(57) ABSTRACT

A phonics prism system includes a transparent base having lights and filters that illuminate text located under the base. A sensor reads text located under the transparent base and a microphone receives input from a user's voice. A feedback program control the lights and filters based on input from the sensor and the microphone to determine how to illuminate the text. A mirror is located at a rear side of the base allowing a user to view themselves as they read text under the base. A transparent cover extends from a top portion of the mirror diagonally to a front side of the base.

6 Claims, 1 Drawing Sheet

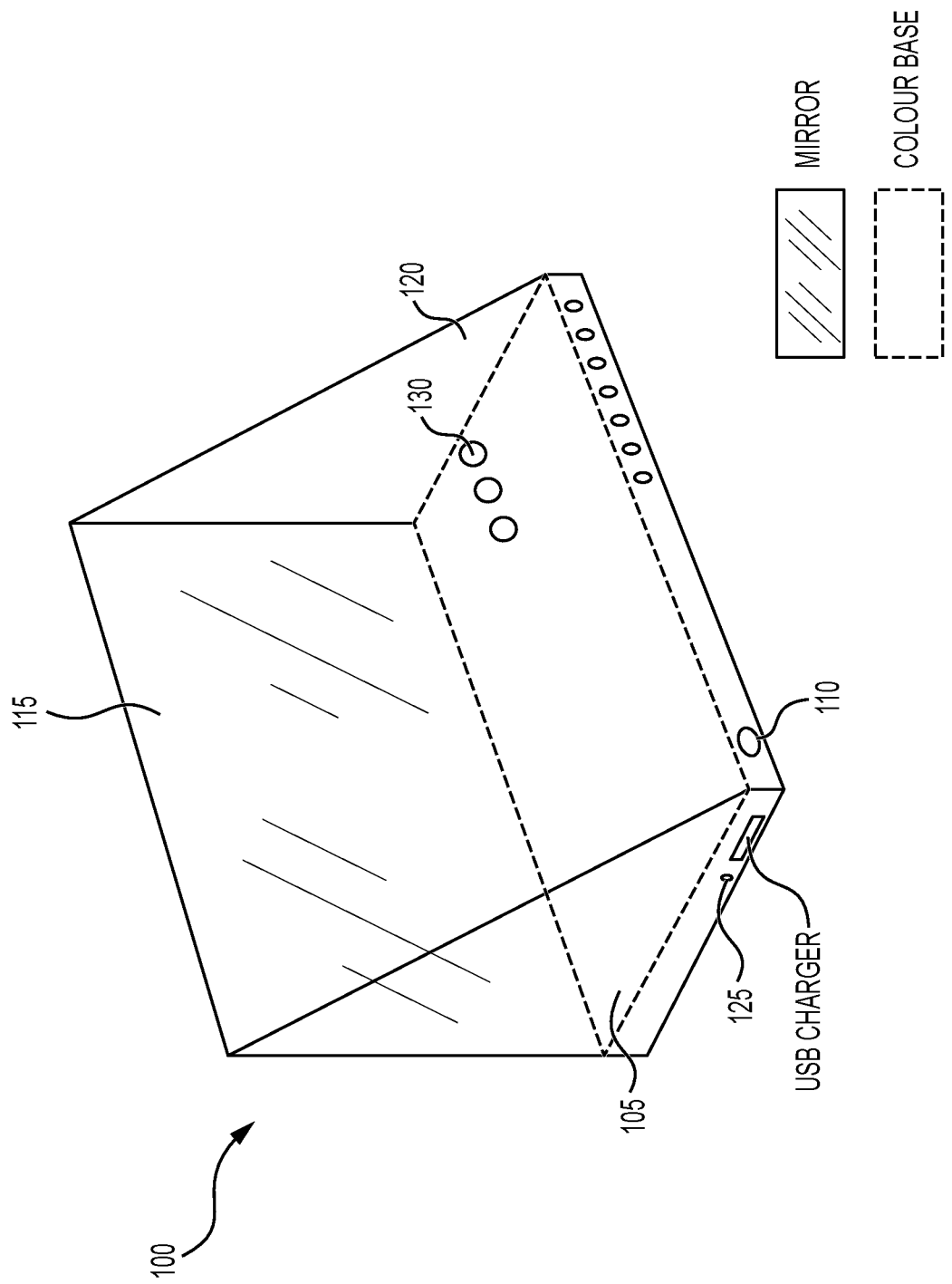

PHONICS PRISM SYSTEM FOR THE DYSLEXIC

BACKGROUND

1. Field

The present disclosure relates to enhancing phonics skill for the dyslexic, and particularly to a system for enhancing phonics skills for dyslexic students.

2. Description of the Related Art

Dyslexia is a specific learning disorder that affects reading and spelling. Individuals with dyslexia often struggle with decoding words and understanding the relationship between sounds and letters.

Accordingly, there remains a need for assisting people suffering from dyslexia in learning how to read and with reading.

SUMMARY

There is a need for a dyslexia-friendly reading tool to help dyslexic students improve their phonics and reading fluency. These difficulties can be addressed by using a multi-sensory approach. A device, such as a phonics prism, that uses colors, mirrors, and lights to highlight words, letter combinations, and phonetic patterns can provide visual cues emphasizing the connections between sounds and letters. This will allow dyslexic students to better understand phonics principles and improve their decoding skills. Using the phonics prism, dyslexic students can experience a more engaging and interactive reading process. The device encourages students to focus on the specific phonetic elements of words, which can lead to increased confidence, improved reading fluency and better comprehension. Ultimately, the goal is to empower dyslexic students and equip them with the tools they need to succeed in reading and learning.

A phonics prism system, in one embodiment, includes a transparent base having lights and filters that illuminate text located under the base. A sensor reads text located under the transparent base, and a microphone receives input from a user's voice. A feedback program controls the lights and filters based on input from the sensor and the microphone to determine how to illuminate the text.

The phonics prism system further includes a mirror located at a rear side of the base allowing a user to view themselves as they read text under the base. A transparent cover extends from a top portion of the mirror diagonally to a front side of the base. The transparent cover is glass in some embodiments.

The base can further include a headphone jack and a speaker.

The feedback program illuminates words in different colors using the lights and filters, and can highlight portions of the text using the lights and filters to aid in reading comprehension.

The feedback program can additionally track the reading fluency of a user.

These and other features of the present subject matter will become readily apparent upon further review of the following specification.

BRIEF DESCRIPTION OF THE DRAWINGS

The sole FIGURE shows a perspective view of a phonics prism system.

Similar reference characters denote corresponding features consistently throughout the attached drawings.

DETAILED DESCRIPTION OF THE PREFERRED EMBODIMENTS

The following definitions are provided for the purpose of understanding the present subject matter and for construing the appended patent claims.

Definitions

Throughout the application, where products are described as having, including, or comprising specific components, or where processes are described as having, including, or comprising specific process steps, it is contemplated that products of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A "Phonics Prism" is a handheld device designed to assist dyslexic students with their phonics skills. It uses a combination of colours, mirrors, and lights to enhance their reading experience. The device includes a small prism-shaped object with a comfortable grip that students can hold. It has an integrated LED light system and a built-in microphone. When students read aloud into the microphone, the Phonics Prism analyzes their speech patterns and can use colour filters to emphasise specific phonetic sounds.

The sole FIGURE shows an illustration of a phonics prism system 100. It includes a transparent base 105 having lights and filters that illuminate text located under the base 105. A sensor reads text located under the transparent base 105, and a microphone 110 receives input from a user's voice. A feedback program controls the lights and filters based on input from the sensor and the microphone 110 to determine how to illuminate the text.

The phonics prism system 100 further includes a mirror 115 located at a rear side of the base 105 allowing a user to view themselves as they read text under the base 105. A transparent cover 120 extends from a top portion of the mirror diagonally to a front side of the base 105. The transparent cover 120 is glass in some embodiments.

The base 105 can further include a headphone jack 125 and a speaker 130.

The feedback program illuminates words in different colors using the lights and filters, and can highlight portions of the text using the lights and filters to aid in reading comprehension.

The feedback program can additionally track the reading fluency of a user.

The "Phonics Prism" can be a portable and lightweight device that makes it easy for students to carry it around and use at school or home. It can be battery-operated and can be charged using a USB cable.

By providing a multi-sensory approach to learning phonics, the Phonics Prism aims to support dyslexic students in developing their reading skills outside of traditional digital apps, pens, rulers, or whiteboards.

The device can include a handheld unit with a built-in light source, mirrors, and coloured filters.

To start, the student should find a quiet and well-lit area for reading. The Phonics Prism should be held in front of their eyes, and ensure that the light source is turned on and facing the student. The mirrors within the device will reflect the light and direct it towards the coloured filters. These filters will be designed to enhance the reading experience for dyslexic individuals.

As students read, they must focus on the text or page they wish to read. The light from the device, when passed through the coloured filters, can help increase contrast, reduce visual stress, and improve visual tracking abilities. It may also help dyslexic individuals perceive text more clearly. For example, if a dyslexic student has trouble distinguishing between "b" and "d," the Phonics Prism might illuminate the prism with a blue colour for "b" sounds and a red colour for "d" sounds. This visual cue helps reinforce the correct pronunciation and improves phonetic recognition.

The Phonics Prism mainly works with phonetic sounds and decides which feedback to provide. The device can be a helpful resource used in phonics, which is the method of teaching reading and spelling by focusing on the sounds of letters and letter combinations. The Phonics Prism can provide as an interactive and multisensory approach to phonics instruction. It can incorporate visual aids, storytelling, and hands-on activities to engage learners and reinforce their understanding of phonics concepts. This device can be valuable for educators and learners looking to strengthen their phonics skills.

The feedback program/software used in the Phonics Prism device can be related to education and assisting dyslexic students in improving their phonics and reading fluency. The software can provide interactive and customisable exercises to assist dyslexic students in improving their phonics and reading fluency. In certain embodiments, the software offers:

1. A range of features to support reading and overall literacy skills. It can include text-to-speech functionality, word prediction, and various reading tools.
2. Text-to-Speech Software: A text-to-speech application that can convert written text into spoken words. This tool can assist dyslexic students by reading out loud the content they encounter, helping them comprehend and follow along more quickly.
3. Reading Fluency Tracker: A software tool that can help track dyslexic students' reading progress over time. It could provide assessments, track reading speed, and offer personalised feedback to help students improve their fluency.
4. This application can include font customisation, background colour adjustments, and features like highlighting to aid reading comprehension.

The software can also include antivirus programs that protect against malware and viruses, disk clean-up tools that free up storage space on a computer, system optimisation software that helps improve performance, file recovery programs that retrieve deleted files, and backup software that creates copies of essential data.

Additionally, the Phonics Prism can have a built-in mirror that allows students to see their mouth movements while reading. This feedback helps them notice mispronunciations and self-correct their articulation, improving their phonics skills.

The importance of this tool lies in its ability to assist students in improving their phonics skills.

By using the Phonics Prism, dyslexic students can potentially overcome some of these challenges. The combination of colours, mirrors, and lights may help enhance their reading experience by providing visual cues that aid in phonetic recognition. As a result, students may find distinguishing between different sounds and letter combinations easier, ultimately improving their ability to decode and understand words.

The benefits of the Phonics Prism can extend beyond immediate improvement in reading skills. By feeling more confident and successful in their reading abilities, dyslexic students may also experience increased motivation and engagement with their learning. This can have a positive impact on their overall academic performance and self-esteem.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A handheld phonics prism system for dyslexic students, comprising:
    a transparent base having lights and filters that illuminate text located under the transparent base, the transparent base having a front side, a rear side spaced from the front side and disposed opposite to the front side, a left side connecting the front and rear sides to one another, and a right side spaced from the left side and connecting the front and rear sides to one another, the transparent base defining a first plane;
    a sensor that reads text located under the transparent base;
    a microphone that receives a user's voice;
    a mirror located at the rear side of the transparent base, the mirror extending from the rear side of the transparent base and defining a second plane, the second plane crossing the first plane, the mirror allowing a dyslexic student to view themselves as they read text under the transparent base;
    a transparent cover extending from a top portion of the mirror diagonally to the front side of the transparent base; and
    a feedback program that controls the lights and filters based on input from the sensor and the microphone to determine how to illuminate the text,
    wherein the feedback program controls the lights and filters to illuminate different words in different colors using the lights and filters to assist the dyslexic student in distinguishing between different sounds and letter combinations, thereby improving the dyslexic student's ability to decode and understand words.

2. The handheld phonics prism system for dyslexic students as recited in claim 1, wherein the transparent cover is glass.

3. The handheld phonics prism system for dyslexic students as recited in claim 1, wherein the transparent base further comprises a headphone jack.

4. The handheld phonics prism system for dyslexic students as recited in claim 1, wherein the transparent base further comprises a speaker.

5. The handheld phonics prism system for dyslexic students as recited in claim 1, wherein the feedback program controls the lights and filters to highlight portions of the text using the lights and filters to aid in reading comprehension.

6. The handheld phonics prism system for dyslexic students as recited in claim 1, wherein the feedback program tracks reading fluency of a user.

* * * * *